(12) United States Patent
Wang et al.

(10) Patent No.: US 12,346,784 B2
(45) Date of Patent: Jul. 1, 2025

(54) INTELLIGENT SCORING OF MISSING DATA RECORDS

(71) Applicant: International Business Machines Corporation, Armonk, NY (US)

(72) Inventors: Jin Wang, Xi'an (CN); Si Er Han, Xi'an (CN); Lei Gao, Xian (CN); Jing James Xu, Xi'an (CN); A Peng Zhang, Xian (CN); Jun Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 17/022,734

(22) Filed: Sep. 16, 2020

(65) Prior Publication Data

US 2022/0083918 A1    Mar. 17, 2022

(51) Int. Cl.
  *G06N 20/20* (2019.01)
  *G06F 16/215* (2019.01)
  *G06F 16/28* (2019.01)

(52) U.S. Cl.
  CPC ........... *G06N 20/20* (2019.01); *G06F 16/215* (2019.01); *G06F 16/285* (2019.01)

(58) Field of Classification Search
  CPC ...... G06N 20/20; G06F 16/285; G06F 16/215
  USPC ......................................................... 716/12
  See application file for complete search history.

(56) References Cited

U.S. PATENT DOCUMENTS

| | | | |
|---|---|---|---|
| 9,443,194 B2 | 9/2016 | Chu | |
| 10,147,041 B2 | 12/2018 | Gao | |
| 2013/0035576 A1* | 2/2013 | O'Grady | A61B 5/6853 600/373 |
| 2013/0226842 A1* | 8/2013 | Chu | G06N 5/025 706/12 |
| 2014/0058282 A1* | 2/2014 | O'Grady | A61B 5/6852 600/546 |
| 2015/0066157 A1* | 3/2015 | Karypis | G06F 9/4843 700/3 |
| 2016/0155069 A1* | 6/2016 | Hoover | G06Q 30/06 706/12 |
| 2019/0340533 A1* | 11/2019 | Copper | G06N 3/084 |
| 2020/0090075 A1 | 3/2020 | Achin | |
| 2020/0302234 A1* | 9/2020 | Walters | G06F 16/9035 |

(Continued)

OTHER PUBLICATIONS

Myneni et al., "Correlated Cluster-Based Imputation for Treatment of Missing Values", © Springer Science+Business Media Singapore 2017, DOI 10.1007/978-981-10-2471-9_17, 8 pages.

(Continued)

*Primary Examiner* — Austin Hicks
(74) *Attorney, Agent, or Firm* — Randy Tejeda (57) ABSTRACT

One or more computer processors group a plurality of predictors contained in training data into a plurality of predictor groups. The one or more computer processors create a plurality of sample sets, wherein each sample set in the plurality of sample sets contains one or more predictors selected from a respective predictor group in the plurality of predictor groups. The one or more computer processors create a cluster model for each created sample set in the plurality of created sample sets. The one or more computer processors generate a score for a record with one or more missing values utilizing at least one created cluster model of the created cluster models and at least one created sample set of the created sample sets.

20 Claims, 6 Drawing Sheets

(56) References Cited

U.S. PATENT DOCUMENTS

2021/0182602 A1* 6/2021 V ................... G06F 18/2155
2021/0374164 A1* 12/2021 Ghoula ............. G06F 18/22

OTHER PUBLICATIONS

Srinivasan et al., "Feature Importance and Predictive Modeling for Multi-source Healthcare Data with Missing Values", DH '16, Apr. 11-13, 2016, Montreal, QC, Canada, © 2016 ACM, 8 pages, <http://dx.doi.org/10.1145/2896338.2896347>.

Rahman et al., "FIMUS: A Framework for Imputing Missing Values Using Co-Appearance, Correlation and Similarity Analysis", Preprint submitted to Knowledge-Based Systems, Dec. 11, 2013, 28 pages.

* cited by examiner

| 1 | P3 | P6  | P7  | P9  |
|---|----|-----|-----|-----|
| 2 | P1 | P5  | P8  | P15 |
| 3 | P2 | P11 | P12 | P14 |
| 4 | P4 | P16 | P13 | P10 |

FIG. 3

| 1 | P3 | P6  | P7  | P9  |
|---|----|-----|-----|-----|
| 2 | P1 | P5  | P8  | P15 |
| 3 | P2 | P11 | P12 | P14 |
| 4 | P4 | P16 | P13 | P10 |

INTELLIGENT SCORING OF MISSING DATA RECORDS

BACKGROUND

The present invention relates generally to the field of machine learning, and more particularly to scoring records with missing values.

In statistics, classification (e.g., scoring) is the problem of identifying to which of a set of categories belongs (predictors) a new observation or predicting the value of the new observation based on a training set of data containing values (e.g., observations, instances, etc.).

SUMMARY

Embodiments of the present invention disclose a computer-implemented method, a computer program product, and a system. The computer-implemented method includes one or more computer processers grouping a plurality of predictors contained in training data into a plurality of predictor groups. The one or more computer processors create a plurality of sample sets, wherein each sample set in the plurality of sample sets contains one or more predictors selected from a respective predictor group in the plurality of predictor groups. The one or more computer processors create a cluster model for each created sample set in the plurality of created sample sets. The one or more computer processors generate a score for a record with one or more missing values utilizing at least one created cluster model of the created cluster models and at least one created sample set of the created sample sets.

DETAILED DESCRIPTION

Big data is being applied to more and more scenarios, where data analysis, model building, and score prediction are common and frequently utilized processes. In many common occasions training data is not clear of errors and may contain a plurality of missing values. Traditionally, systems discard records (e.g., training samples) with missing values but in situations where training data is limited, systems cannot afford to lose additional records. Furthermore, some systems may attempt to rectify missing values during model building rather than during the scoring phase. Current score processes have the following drawbacks: systems eliminate scored records that have one or more missing values; systems utilize basic statistical values (e.g. mean, mode, etc.) in order to approximate and replace one or more missing values; and systems lose information in discarded data.

Embodiments of the present invention propose an intelligent method to score the record with missing value. Embodiments of the present invention retain scored records with one or more missing values. Embodiments of the present invention utilize retained scored records with one or more missing values to make a subsequent prediction. Embodiments of the present invention, randomly, select a subset of predictor fields contained in training data without any missing values (e.g., complete records) and build a model (e.g., cluster) to represent the score result. Embodiments of the present invention identify one or more sample sets to approximate missing values associated with one or more records. Embodiments of the present invention define one method to ensure that all the varieties of records with missing values are be effectively retained and utilized in a subsequent prediction. Embodiments of the present invention identify a plurality of top sample sets (e.g., correlation based sample subsets) and models that relate to one or more records with missing values. Embodiments of the present invention recognize that retaining records with missing values increases subsequent model accuracy while reducing computationally intensive data preprocessing such as the reduction of costly data validation and subsequent remediation attempts. Embodiments of the present invention recognize that retaining and utilizing (e.g., scoring) records with missing values allows models with limited training data to have high relative accuracy by increasing training set size though the inclusion of records that would otherwise have been removed. Implementation of embodiments of the invention may take a variety of forms, and exemplary implementation details are discussed subsequently with reference to the Figures.

The present invention will now be described in detail with reference to the Figures.

Figure 1:
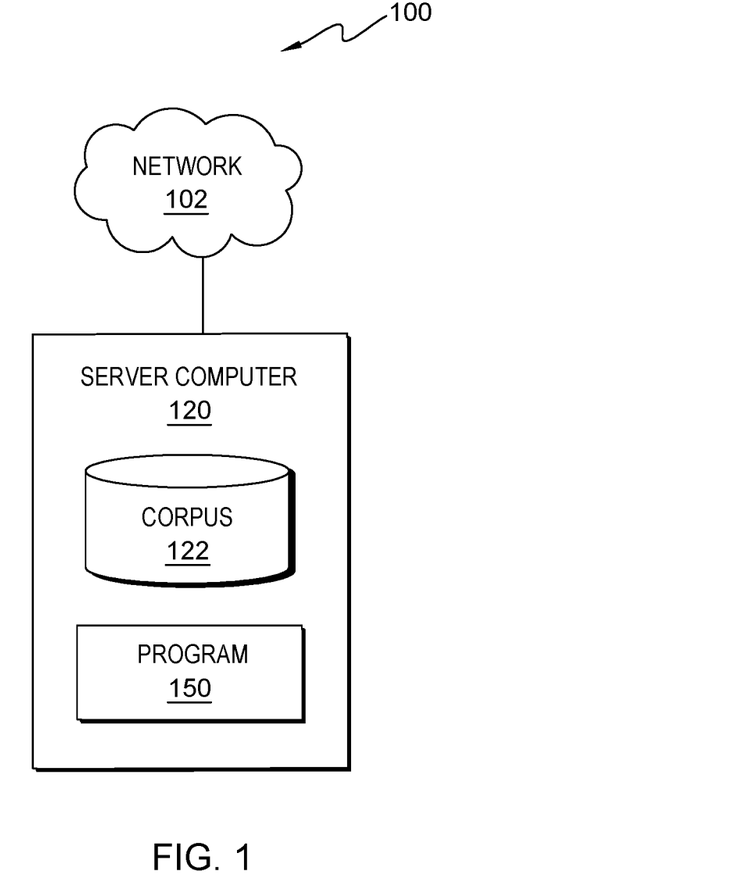
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes corpus 122 and program 150. In other embodiments, server computer 120 may contain other applications, databases, programs, etc. which have not been depicted in computational environment 100. Server computer 120 may include internal and external hardware components, as depicted and described in further detail with respect to FIG. 9.

Corpus 122 is a repository for data used by program 150. In the depicted embodiment, corpus 122 resides on server computer 120. In another embodiment, corpus 122 may reside elsewhere within computational environment 100 provided program 150 has access to corpus 122. A database is an organized collection of data. Corpus 122 can be implemented with any type of storage device capable of storing data and configuration files that can be accessed and utilized by program 150, such as a database server, a hard disk drive, or a flash memory. In an embodiment, corpus 122 stores data used by program 150, such as historical sample sets and associated cluster models. In an embodiment, corpus 122 contains training data (i.e., training sets) that contains a plurality of records (i.e., training samples) that either have a complete (e.g., no missing values) set of associated values at each predicator (e.g., position) or have a set of associated values containing missing values (e.g., null values).

Program 150 is a program for scoring one or more records with one or more missing values utilizing a plurality of related sample sets and associated cluster models. In various embodiments, program 150 may implement the following steps: group a plurality of predictors contained in training data into a plurality of predictor groups; create a plurality of sample sets, wherein each sample set in the plurality of sample sets contains one or more predictors selected from a respective predictor group in the plurality of predictor groups; create a cluster model for each created sample set in the plurality of created sample sets; and generate a score for a record with one or more missing values utilizing at least one created cluster model of the created cluster models and at least one created sample set of the created sample sets. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as corpus 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
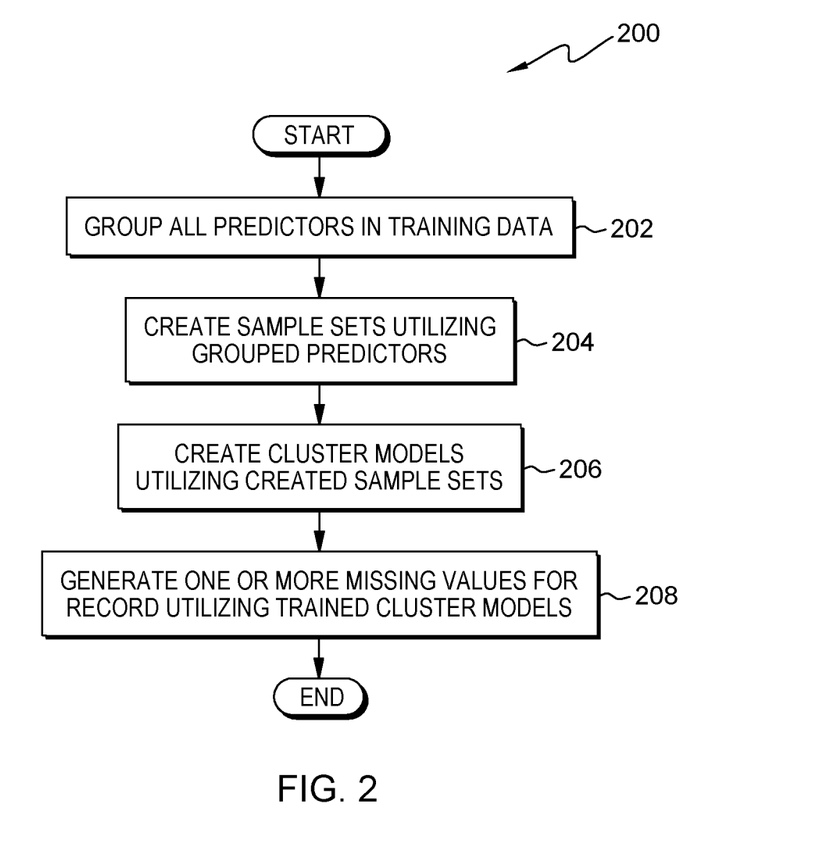
FIG. 2 is a flowchart depicting operational steps of a program, on a server computer within the computational environment of FIG. 1, for scoring records with one or more missing values utilizing a plurality of related sample sets and associated cluster models, in accordance with an embodiment of the present invention.

FIG. 2 is a flowchart depicting operational steps of program 150 for scoring one or more records with one or more missing values utilizing a plurality of related sample sets and associated cluster models, in accordance with an embodiment of the present invention.

In an embodiment, program 150 initiates responsive to a user inputted record with missing information or a system detected incomplete record. In various embodiments, program 150 monitors one or more corpora (e.g., corpus 122) for records with missing data or incomplete information. In an embodiment, program 150 initiates responsive to a scoring request.

Figure 3:
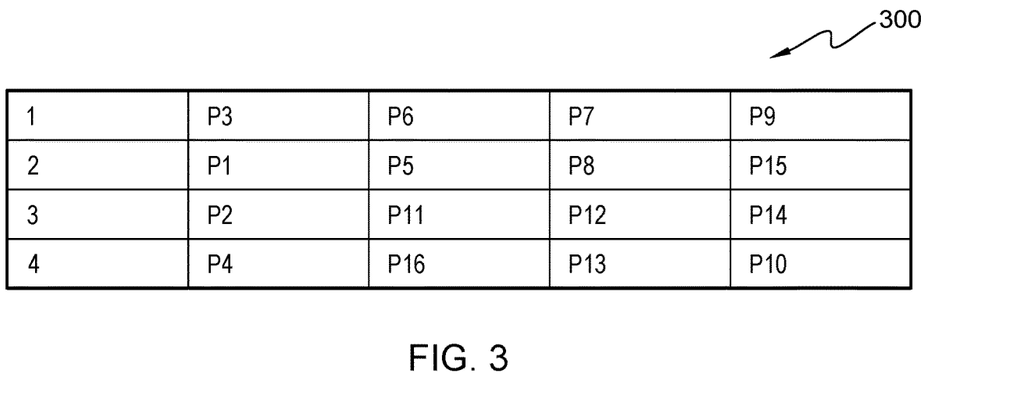
FIG. 3 is an exemplary table, in accordance with an embodiment of the present invention.

Program 150 groups all predictors in training data (step 202). In an embodiment, program 150 iterates through all predictors contained in the training data and assigns each predicator to a predictor group. In this embodiment, program 150 creates each predictor group by extracting one or more correlations between predictors utilizing statistical analysis such as Pearson, Spearman and/or chi squared. In an embodiment, program 150 determines the number of predictor groups by utilizing the square root of the number of distinct predictors in the training data. For example, in the situation where program 150 identifies that there are 16 predictors in the training data, program 150 creates four predictor groups. In this embodiment, program 150 requires that a record with missing data has at least complete values on the determined number of predictor groups. In another embodiment, program 150 receives a user specified number of predictor groups. In an embodiment, program 150 creates a plurality of predictor groups and, initially, randomly assigns a predictor to each predictor group until each predictor group has at least one assigned predictor. In a further embodiment, responsive to program 150, initially, determining the number of groups, program 150 groups each remaining predictor into a respective group by utilizing the correlation (i.e., Cor( )) between each remaining predictor and each predictor already assigned in each group. For example, if group1 contains predictor P3 and group2 contains predictor P6, then program 150 utilizes one or more correlation techniques, as detailed above, to assign (e.g., Cor(P7, P3), Cor(P7, P6)) predictor P7 to group1 or group2 based on respective correlations. In an embodiment, program 150 requires that the number of predictors with records associated with missing data is less than the square root of the total number of predictors. FIG. 3 demonstrates the grouping process detailed above.

Program 150 creates a sample set utilizing the grouped predictors (step 204). In an embodiment, program 150, randomly, selects (e.g., samples) a predictor, one or more associated records, and values, without repeat, from the plurality of predictor groups until the number of selected (i.e., assigned to a sample set) predictors meets or exceeds a sample set threshold. In an embodiment, program 150 sets the sample set threshold subject to user input. In another embodiment, program 150 sets the sample threshold as double the number of predictors (e.g., 16 predictors*2=32 samples). Program 150 selects one or more samples to relate to a record containing missing data, values, or information. In various embodiments, program 150 selects a predictor in each predictor group to utilize as a combined sample to represent the record with missing data. As further depicted in the sorted table in FIG. 9, program 150 selects and creates a set of samples containing (P3, P5, P11, P13). In an embodiment, program 150 adds associated records to said sample set only if said records in the training data fulfill the requirement that associated values in locations (i.e., predictors) (3, 5, 11, 13) are not missing. For example, a record in the training data contains the following value set: [4.12, 3.532, 1.21, 2.42, 4.53, 2.1, 3.2, 5.6, 213, 41, 8.91, 34, null, null, null, 2.234] and therefore is not added to the sample set due to a missing value in position (e.g., predictor) 13. In an embodiment, program 150 creates a formed vector representing the record with missing data.

Program 150 builds one or more cluster models utilizing the created sample set (step 206). In an embodiment, program 150 extracts each record in the created sample sets and generates a single vector representing said record. In an embodiment, program 150 creates a cluster model utilizing the records contained in the created sample set. For example, program 150 clusters each record in the sample set in a two-step cluster. In an embodiment, program 150 calculates a cluster center vector and utilizes said vector as an approximated score result. In this embodiment, program 150 utilizes the approximated score result to approximate one or more missing values in one or more records, in subsequent scoring. In various embodiments, program 150 creates a plurality of sample sets and, here, program 150 builds a cluster model for each sample set in the plurality of sample sets.

Program 150 generates score for record with missing values utilizing trained cluster models and created sample sets (step 208). In various embodiments, program 150 reduces the record with missing data into three categories: suitable, inexact suitable, and not suitable based on the one or more relationships between a record with missing data and each sample set and associated clusters. As used herein, a suitable record is defined as a record that has one or more sample sets that directly map each predictor that is not missing values with the record with one or more missing values. In an embodiment, program 150 determines the record (i.e., record with missing values) is suitable if one or more created sample sets match directly to the record. For example, a sample set contains values at the following predicators (P3, P5, P11, P4) and there exists a record containing values in positions (3, 4, 5, 11) but with missing data in every other position. In this example, the record contains the following values [null, null, 1.21, 2.42, 4.53, null, null, null, null, null, 8.91, null, null, null, null, null]. Here, program 150 utilizes one or more center vectors calculated from the created clusters in step 206 to subsequently approximate the missing values associated with the record. For example, if a calculated center vector of a cluster contains the following values [3.12, 2.31, 4.56, 23.56, 345, 6.70, 8.66, 34, 29.08, 88, 97, 12, 13, 16.7, 43.88, 12.05], then program 150 adds said sample set to a set of top sample sets (i.e., sample sets that contained missing values along with matching predictors). In an embodiment, every determined suitable sample set and associated cluster model is added to a set of top sample sets.

As used herein, inexact suitable record is defined as a record having a plurality of sample sets that each contribute to a predictor mapping but not a single sample set in the plurality of sample sets completely maps to the record with one or more missing values. In an embodiment, program 150 determines that the record is an inexact suitable record. Here, program 150 determines that the record contains missing values that are not completely encompassed by a sample set but rather is encompassed by multiple sample sets. For example, a record has values missing on positions (3, 4, 5, 11), however, no single sample set contains values for all missing values. In this example, there exists a plurality of sample sets, e.g., (P3, P5, P11, P16) and (P9, P5, P11, P4), that when combined contains values for all the missing values in the record. For example, the record contains: [null, null, 1.21, 2.42, 4.53, null, null, null, null, null, 8.91, null, null, null, null, null]. Continuing from the previous example, sample set (P3, P5, P11, P16) contains values of 1.21, 4.53, and 8.91 for positions 3, 5, 11 and sample set (P9, P5, P11, P4) contains values of 2.42, 4.53, and 8.91 for positions 4, 5, 11. In an embodiment, responsive to an inexact suitable determination, program 150 calculates a distance (i.e., correlation value) between the record with a plurality of samples to determine a set of top samples. Here, program 150 iterates through each sample set, if program 150 identifies more than one related predictor (e.g., P11 and P12), program 150 then calculates a weighted correlation value. For example, (Cor(P11, P11)+Cor(P12, P11))/2 and (Cor(P11, P14)+Cor(P12, P14))/2. In an embodiment, program 150 calculates said distance by normalizing all correlation values and identifying the largest correlation value. For example, Cor(P6, P3)=0.88 and Cor(P6, P9)=0.79, thus the most related (e.g., distance) predictors in group1 is Cor(P6, P3) and group1 is added to a set of top samples. In this embodiment, larger calculated distances signify more related predicators. As used herein, unsuitable record is defined as a record that has no matching or mapped predictors between the record and each sample set in the plurality of sample sets. In another embodiment, program 150 determines that record is an unsuitable record signifying that the record contains one or more missing values that do not exist in any of the sample sets. For example, a record contains [null, null, 1.21, 2.42, 4.53, null, null, null, null, null, 8.91, null, null, null, null, null] but unfortunately none of these values are available in the samples selected in step 204. In an embodiment, program 150, responsively, removes the record from the training data.

Responsive to program 150 determining a record category (e.g., suitable, inexact suitable, and insatiable) and identifying one or more top sample sets, program 150 calculates a form vector representing each top sample set. In an embodiment, for suitable records, the formed vector is added directly to the top sample set. In an embodiment, program 150 maps samples with missing data to one or more sample sets that collectively encompass the missing data. In an embodiment, responsive to a created top sample set, program 150 utilizes ensemble scoring to generate a score defined by the distance between the formed vector to each cluster center associated with each trained cluster associated with each sample set in the top sample set. In an embodiment, program 150 utilizes the correlation distance between the formed vector and each associated cluster center in the top sample set as a continuous value and assigns said value as a score to the record with missing data. In another embodiment, program 150 utilizes the distances between the formed vector and each associated cluster center as a weight in a categorical scoring (e.g., voting) process.

FIG. 3 depicts exemplary table 300, in accordance with an illustrative embodiment of the present invention. Exemplary table 300 contains 4 predictor groups, each containing 4 predictors: group1 (P3, P6, P7, P9), group2 (P1, P5, P8, P15), group3 (P2, P11, P12, P14), and group4 (P4, P16, P13, P10).

Figure 4:
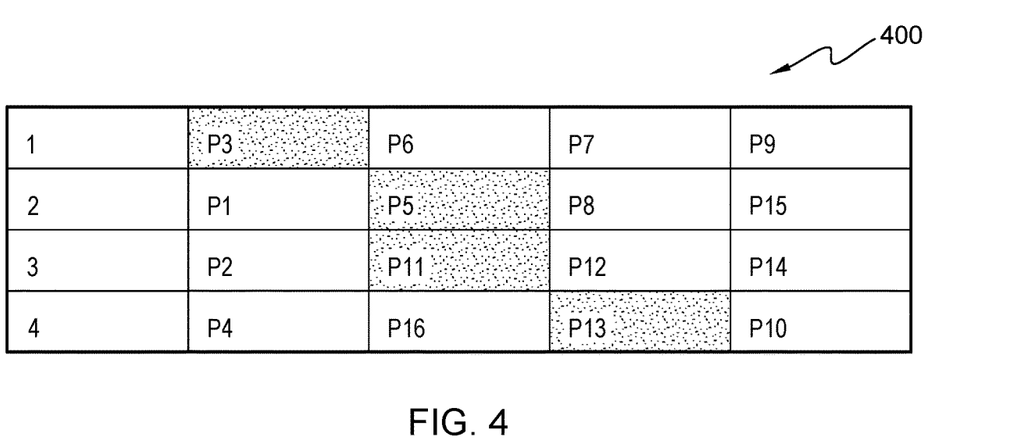
FIG. 4 is an exemplary table, in accordance with an embodiment of the present invention.

FIG. 4 depicts exemplary table 400, in accordance with an embodiment of the present invention. Exemplary table 400 contains 4 predictor groups with a predictor selected from each group (i.e., sample set): (P3, P5, P11, P13).

Figure 5:
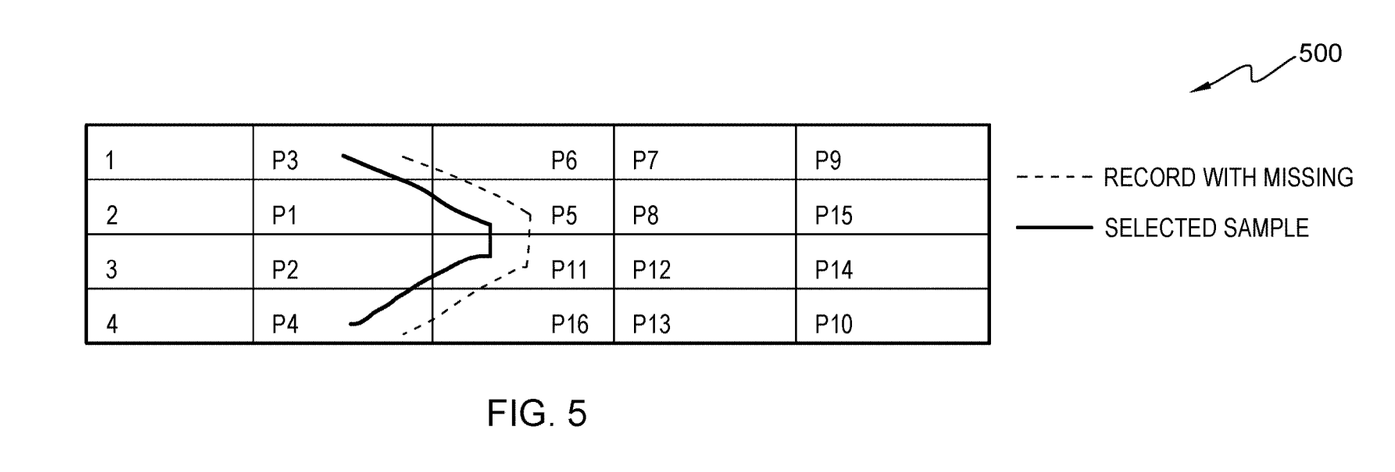
FIG. 5 is an exemplary table, in accordance with an embodiment of the present invention.

FIG. 5 depicts exemplary table 500, in accordance with an embodiment of the present invention. Exemplary table 500 contains 4 predictor groups with an example suitable determination where the selected sample set containing predictors (P3, P4, P5, P11) maps directly to a record with a missing data where said record has data on predictors (P3, P4, P5, P11). In this Figure, program 150 adds the sample set containing predictors (P3, P4, P5, P11) directly to a set of top samples sets and associated clusters.

Figure 6:
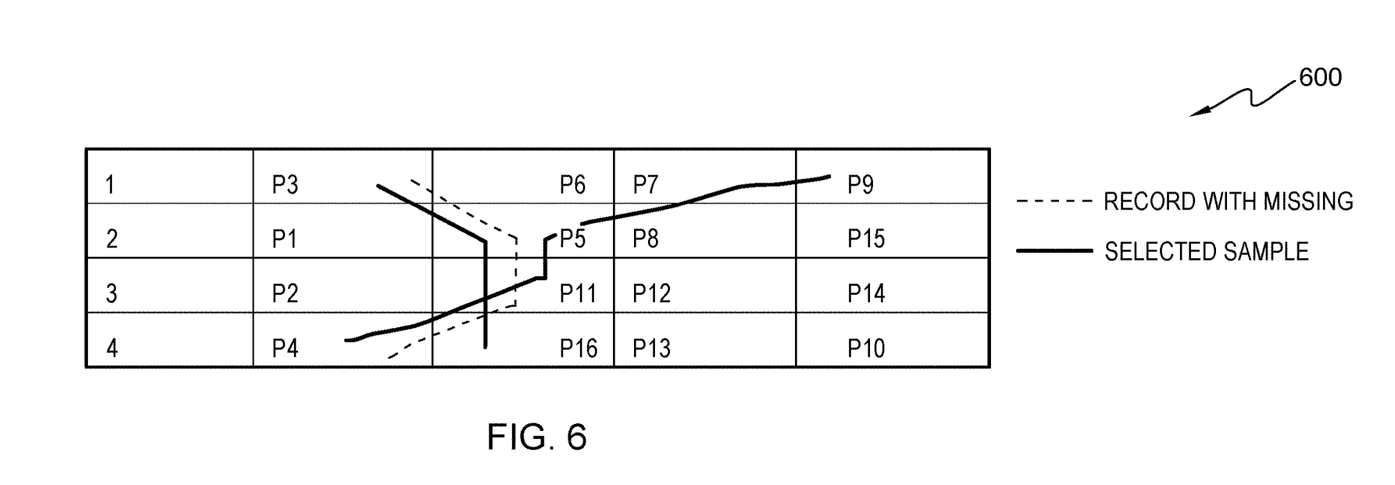
FIG. 6 is an exemplary table, in accordance with an embodiment of the present invention.

FIG. 6 depicts exemplary table 600, in accordance with an embodiment of the present invention. Exemplary table 600 contains 4 predictor groups with an example inexact suitable determination where the selected sample sets (P3, P5, P11, P16) and (P9, P5, P11, P4) incongruently (e.g., collectively) map to a record with a missing data where said record has data on predictors (P3, P4, P5, P11).

Figure 7:
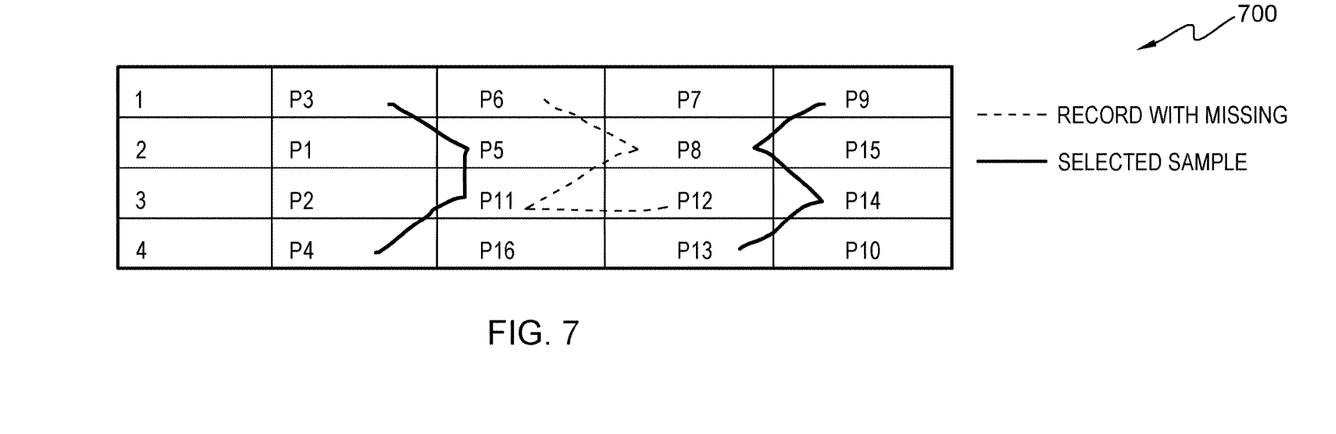
FIG. 7 is an exemplary table, in accordance with an embodiment of the present invention.

FIG. 7 depicts exemplary table 700, in accordance with an embodiment of the present invention. Exemplary table 700 contains 4 predictor groups with an example not suitable determination where the selected sample sets (P3, P5, P11, P16) and (P9, P5, P11, P4) does not map to a record with a missing data where said record has data on predictors (P6, P8, P11, P12).

Figure 8:
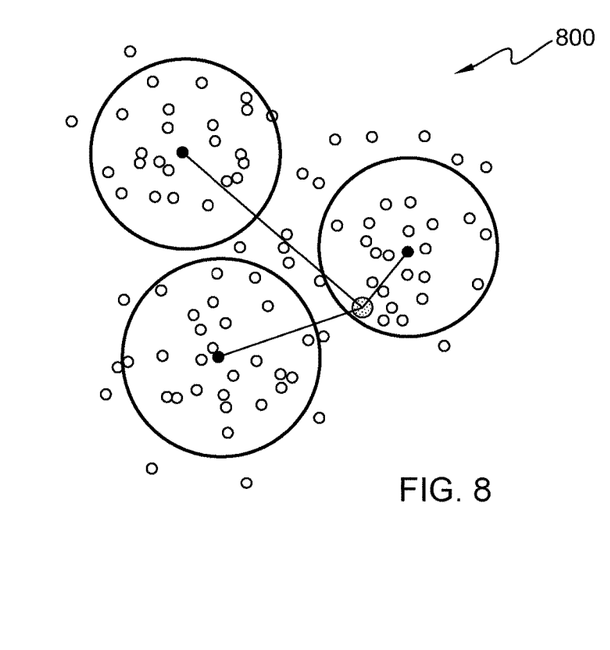
FIG. 8 is an exemplary diagram, in accordance with an embodiment of the present invention.

FIG. 8 depicts exemplary diagram 800, in accordance with an embodiment of the present invention. Exemplary diagram 800 demonstrates a model containing three clusters each associated with a sample set in a determined set of top sample sets selected from the plurality of grouped sample sets, as depicted in FIGS. 5-7. Exemplary diagram 800 demonstrates program 150 utilizing a plurality of calculated distances from a formed vector representing a record with missing data to a plurality of center vectors associated with a plurality of clusters associated with top sample sets.

Figure 9:
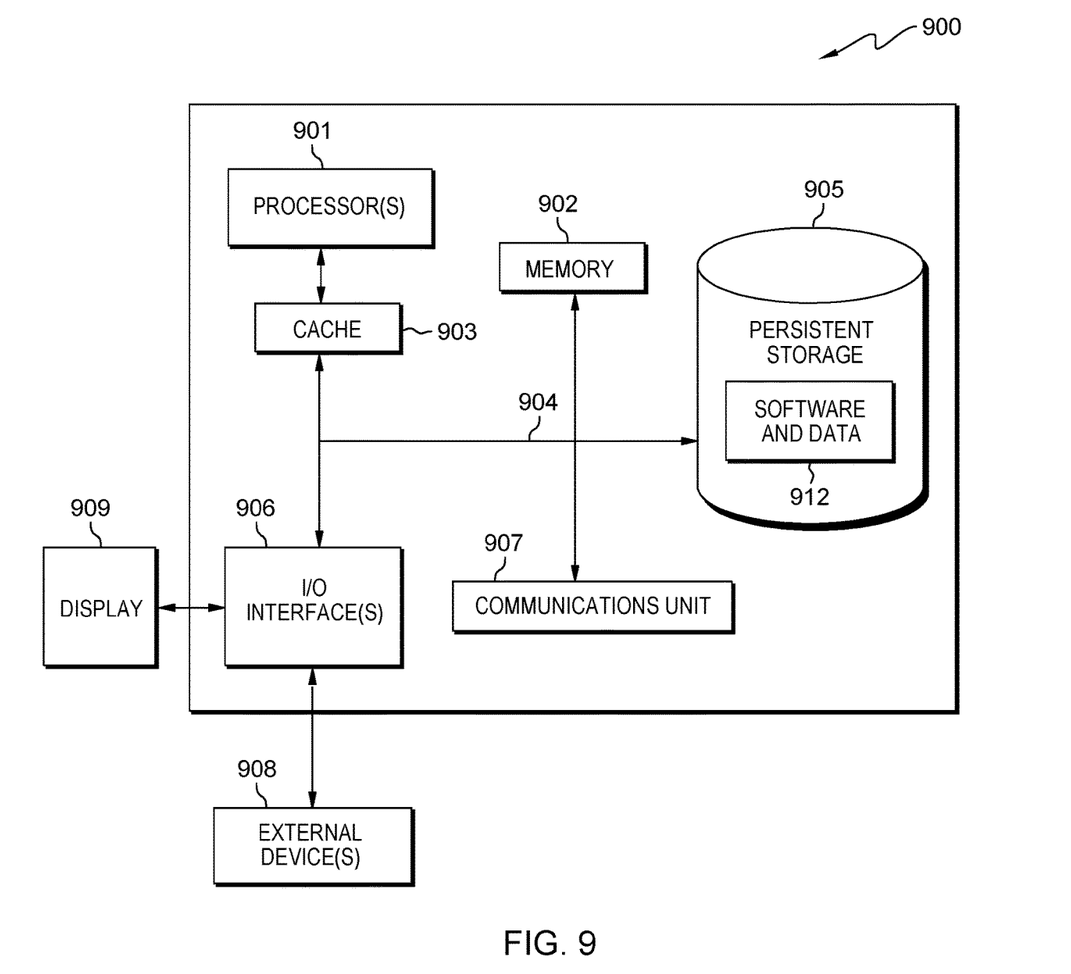
FIG. 9 is a block diagram of components of the server computer, in accordance with an embodiment of the present invention.

FIG. 9 depicts a block diagram of components of server computer 120 in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

Server computer 120 each include communications fabric 904, which provides communications between cache 903, memory 902, persistent storage 905, communications unit 907, and input/output (I/O) interface(s) 906. Communications fabric 904 can be implemented with any architecture designed for passing data and/or control information between processors (such as microprocessors, communications, and network processors, etc.), system memory, peripheral devices, and any other hardware components within a system. For example, communications fabric 904 can be implemented with one or more buses or a crossbar switch.

Memory 902 and persistent storage 905 are computer readable storage media. In this embodiment, memory 902 includes random access memory (RAM). In general, memory 902 can include any suitable volatile or non-volatile computer readable storage media. Cache 903 is a fast memory that enhances the performance of computer processor(s) 901 by holding recently accessed data, and data near accessed data, from memory 902.

Program 150 may be stored in persistent storage 905 and in memory 902 for execution by one or more of the respective computer processor(s) 901 via cache 903. In an embodiment, persistent storage 905 includes a magnetic hard disk drive. Alternatively, or in addition to a magnetic hard disk drive, persistent storage 905 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 905 may also be removable. For example, a removable hard drive may be used for persistent storage 905. Other examples include optical and magnetic disks, thumb drives, and smart cards that are inserted into a drive for transfer onto another computer readable storage medium that is also part of persistent storage 905. Software and data 412 can be stored in persistent storage 905 for access and/or execution by one or more of the respective processors 901 via cache 903.

Communications unit 907, in these examples, provides for communications with other data processing systems or devices. In these examples, communications unit 907 includes one or more network interface cards. Communications unit 907 may provide communications through the use of either or both physical and wireless communications links. Program 150 may be downloaded to persistent storage 905 through communications unit 907.

I/O interface(s) 906 allows for input and output of data with other devices that may be connected to server computer 120. For example, I/O interface(s) 906 may provide a connection to external device(s) 908, such as a keyboard, a keypad, a touch screen, and/or some other suitable input device. External devices 908 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 905 via I/O interface(s) 906. I/O interface(s) 906 also connect to a display 909.

Display 909 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    monitoring, by one or more computer processors, a database server for training data with one or more missing values;
    grouping, by one or more computer processors, a plurality of predictors contained in the training data into a plurality of predictor groups, wherein a number of predictors in the plurality of predictors associated with records with the one or more missing values is less than a square root of a total number of predictors;
    creating, by one or more computer processors, a plurality of sample sets, wherein each sample set in the plurality of sample sets contains one or more predictors selected from a respective predictor group in the plurality of predictor groups;
    training, by one or more computer processors, a cluster model for each created sample set in the plurality of created sample sets; and
    generating, by one or more computer processors, a score for a record with one or more missing values utilizing at least one created cluster model of the created cluster models and at least one created sample set of the created sample sets, comprising:
        responsive to a created top sample set, generating, by one or more computer processors, the score utilizing an ensemble score defined by a distance between a formed vector to each respective center of each cluster associated with each sample set in the top sample set.

2. The computer-implemented method of claim 1, wherein grouping the plurality of predictors contained in the training data into the plurality of predictor groups, comprises:
    creating, by one or more computer processors, the plurality of predictor groups;
    randomly assigning, by one or more computer processors, a predictor in the plurality of predictors to each created predictor group until each predictor group in the plurality of predictor groups has at least one assigned predictor; and
    assigning, by one or more computer processors, each remaining predictor in the plurality of predictors into a respective predictor group by utilizing one or more correlations between each remaining predictor in the plurality of predictors and each predictor group in the plurality of predictors.

3. The computer-implemented method of claim 1, wherein generating the score for the record with one or more missing values utilizing at least one created cluster model of the created cluster models and at least one created sample set of the created sample sets, comprises:
    reducing, by one or more computer processors, the record with one or more missing values into three categories: suitable, inexact suitable, and not suitable based on one or more relationships between a record with one or more missing values, each sample set in the plurality of sample sets, and associated cluster models.

4. The computer-implemented method of claim 3, further comprising:
    calculating, by one or more computer processors, a cluster center vector for each cluster model associated with each created sample set in the plurality of created sample sets.

5. The computer-implemented method of claim 4, further comprising:
    creating, by one or more computer processors, the top sample set from the plurality of samples sets based the category of the reduced record with one or more missing values.

6. The computer-implemented method of claim 5, further comprising:
    ensemble scoring, by one or more computer processors, the record with one or more missing values utilizing a calculated distance between a formed vector to each calculated cluster center associated with each cluster model associated with each sample set in the top sample set, wherein the formed vector represents the record with one or more missing values.

7. The computer-implemented method of claim 6, further comprising:
    generating, by one or more computer processors, the score for the record with one or more missing values utilizing a correlation distance between the formed vector and each associated cluster center in the top sample set as a continuous value.

8. The computer-implemented method of claim 6, further comprising:
    generating, by one or more computer processors, the score for the record with one or more missing values utilizing a correlation distance between the formed vector and each associated cluster center in the top sample set as a weight in a categorical scoring process.

9. A computer program product comprising:
    one or more computer readable storage media and program instructions stored on the one or more computer readable storage media, the stored program instructions comprising:
    program instructions to monitor a database server for training data with one or more missing values;
    program instructions to group a plurality of predictors contained in the training data into a plurality of predictor groups, wherein a number of predictors in the plurality of predictors associated with records with the one or more missing values is less than a square root of a total number of predictors;
    program instructions to create a plurality of sample sets, wherein each sample set in the plurality of sample sets contains one or more predictors selected from a respective predictor group in the plurality of predictor groups;
    program instructions to train a cluster model for each created sample set in the plurality of created sample sets; and
    program instructions to generate a score for a record with one or more missing values utilizing at least one created cluster model of the created cluster models and at least one created sample set of the created sample sets, comprising:
program instructions to responsive to a created top sample set, generate the score utilizing an ensemble score defined by a distance between a formed vector to each respective center of each cluster associated with each sample set in the top sample set.

10. The computer program product of claim 9, wherein the program instructions, to generate the score for the record with one or more missing values utilizing at least one created cluster model of the created cluster models and at least one created sample set of the created sample sets, comprise:
program instructions to reduce the record with one or more missing values into three categories: suitable, inexact suitable, and not suitable based on one or more relationships between a record with one or more missing values, each sample set in the plurality of sample sets, and associated cluster models.

11. The computer program product of claim 10, wherein the program instructions, stored on the one or more computer readable storage media, further comprise:
program instructions to calculate a cluster center vector for each cluster model associated with each created sample set in the plurality of created sample sets.

12. The computer program product of claim 11, wherein the program instructions, stored on the one or more computer readable storage media, further comprise:
program instructions to create the top sample set from the plurality of samples sets based the category of the reduced record with one or more missing values.

13. The computer program product of claim 12, wherein the program instructions, stored on the one or more computer readable storage media, further comprise:
program instructions to ensemble score the record with one or more missing values utilizing a calculated distance between a formed vector to each calculated cluster center associated with each cluster model associated with each sample set in the top sample set, wherein the formed vector represents the record with one or more missing values.

14. The computer program product of claim 13, wherein the program instructions, stored on the one or more computer readable storage media, further comprise:
program instructions to generate the score for the record with one or more missing values utilizing a correlation distance between the formed vector and each associated cluster center in the top sample set as a continuous value.

15. A computer system comprising:
one or more computer processors;
one or more computer readable storage media; and
program instructions stored on the computer readable storage media for execution by at least one of the one or more processors, the stored program instructions comprising:
program instructions to monitor a database server for training data with one or more missing values;
program instructions to group a plurality of predictors contained in the training data into a plurality of predictor groups, wherein a number of predictors in the plurality of predictors associated with records with the one or more missing values is less than a square root of a total number of predictors;
program instructions to create a plurality of sample sets, wherein each sample set in the plurality of sample sets contains one or more predictors selected from a respective predictor group in the plurality of predictor groups;
program instructions to train a cluster model for each created sample set in the plurality of created sample sets; and
program instructions to generate a score for a record with one or more missing values utilizing at least one created cluster model of the created cluster models and at least one created sample set of the created sample sets, comprising:
program instructions to responsive to a created top sample set, generate the score utilizing an ensemble score defined by a distance between a formed vector to each respective center of each cluster associated with each sample set in the top sample set.

16. The computer system of claim 15, wherein the program instructions, to generate the score for the record with one or more missing values utilizing at least one created cluster model of the created cluster models and at least one created sample set of the created sample sets, comprise:
program instructions to reduce the record with one or more missing values into three categories: suitable, inexact suitable, and not suitable based on one or more relationships between a record with one or more missing values, each sample set in the plurality of sample sets, and associated cluster models.

17. The computer system of claim 16, wherein the program instructions, stored on the one or more computer readable storage media, further comprise:
program instructions to calculate a cluster center vector for each cluster model associated with each created sample set in the plurality of created sample sets.

18. The computer system of claim 17, wherein the program instructions, stored on the one or more computer readable storage media, further comprise:
program instructions to create the top sample set from the plurality of samples sets based the category of the reduced record with one or more missing values.

19. The computer system of claim 18, wherein the program instructions, stored on the one or more computer readable storage media, further comprise:
program instructions to ensemble score the record with one or more missing values utilizing a calculated distance between a formed vector to each calculated cluster center associated with each cluster model associated with each sample set in the top sample set, wherein the formed vector represents the record with one or more missing values.

20. The computer system of claim 19, wherein the program instructions, stored on the one or more computer readable storage media, further comprise:
program instructions to generate the score for the record with one or more missing values utilizing a correlation distance between the formed vector and each associated cluster center in the top sample set as a continuous value.

* * * * *